United States Patent
Schmid et al.

(10) Patent No.: US 6,666,129 B1
(45) Date of Patent: Dec. 23, 2003

(54) OPERATING DEVICE FOR A ROTATABLE CLOSING ELEMENT OF A VALVE

(75) Inventors: Werner Schmid, Heidenheim (DE); Martin Sauer, Kaisheim (DE); Holger Wengert, Bopfingen (DE); Willi Wiedenmann, Riesbürg (DE)

(73) Assignee: Tuchenhagen GmbH, Büchen (DE)

( * ) Notice: Subject to any disclaimer, the term of this patent is extended or adjusted under 35 U.S.C. 154(b) by 50 days.

(21) Appl. No.: 10/110,986

(22) PCT Filed: Oct. 18, 2000

(86) PCT No.: PCT/EP00/10253
§ 371 (c)(1),
(2), (4) Date: Apr. 19, 2002

(87) PCT Pub. No.: WO01/29432
PCT Pub. Date: Apr. 26, 2001

(30) Foreign Application Priority Data

Oct. 21, 1999 (DE) .......................................... 199 50 582

(51) Int. Cl.[7] .................................................. F01B 9/00
(52) U.S. Cl. .......................................... 92/136; 92/13.6
(58) Field of Search .................................. 92/13.6, 136

(56) References Cited

U.S. PATENT DOCUMENTS 2,998,805 A 9/1961 Usab
3,165,982 A 1/1965 Taylor
3,391,722 A 7/1968 Ligh
3,508,472 A 4/1970 Hartwick, Jr.
5,054,372 A 10/1991 Weyer

FOREIGN PATENT DOCUMENTS

| DE | 3303872 A | 8/1984 |
|---|---|---|
| DE | 29703710 U | 6/1997 |
| DE | 29814551 U | 11/1998 |
| EP | 0622574 B | 11/1994 |
| FR | 2528128 A | 12/1983 |
| WO | 92/19895 A | 11/1992 |

*Primary Examiner*—Edward K. Look
*Assistant Examiner*—Michael Leslie
(74) *Attorney, Agent, or Firm*—Venable LLP; John P. Shannon (57) ABSTRACT

The invention relates to an operating device for a rotatable closing element of a valve such that, a desired angle of rotation can easily be set and maintained. This is achieved in that two guide grooves (2f), which are incorporated diametrically opposite each other, are bounded on all sides by a piston shank (2b), in that their respective courses are precisely or more or less symmetrical at all points, in that in each instance the courses have, in relation to the axis of the piston (2), a greater pitch angle in a central portion (angle b) than in their two portions on the end side (angle a) (a>b), and in that the stroke of the piston (2) is limited on one side by application of the front-end piston shank (2b) to the cover element (4) and on the other side by application of a piston base (2a) to a stop element (9; 20; 20.1) which is mounted in the housing base (1b) of the housing (1)

12 Claims, 5 Drawing Sheets

OPERATING DEVICE FOR A ROTATABLE CLOSING ELEMENT OF A VALVE

The invention relates an operating device for a rotatable closing element of a valve, in particular a rotating actuator for a disc or throttle valve which can be operated by a pressurized medium, as specified in the preamble of claim 1.

A generic operating device is disclosed in FR-A-2 528 128. In the case of this device the cylindrical housing is in the form of an upper and a lower base and a jacket mounted between these bases, the two cylindrical bases being joined to each other by two stationary longitudinal guides. Each of the latter extends through and guides a piston axially, one which is sealed off from the jacket as it slides. Both the piston and the two cylinder bases are penetrated by a central rotating shaft. Repeated penetration of the piston, first by the longitudinal guides and then by the rotating shaft, necessitates sealing of the piston from a pressurized means chamber formed at all these points of penetration between the piston and the cylinder base next to it and the jacket. A piston shank facing the other cylinder base is provided with two helical guide grooves mounted diametrically opposite each other, grooves which are open in the direction of the projecting cylinder base. The piston shank is connected to one of these projecting cylindrical aprons, one which serves as a stop for the end position of the piston when the interior surface of the adjacent cylinder base is reached. Limitation of the end position in the other direction is ensured by a stop ring mounted in the pressurized medium space and not accessible from the outside in assembly of the operating device.

An operating mechanism with comparable and/or equivalent features is disclosed in DE 297 03 710 U1. This rotating actuator, which is operated in particular with compressed air as pressurized means, is applied by preference for valves in which the closing element may in theory rotate endlessly. Such is the case, for example, with so-called ball and disk valves. In these valves additional measures must be taken to ensure that the rotating actuator involved will be stopped in precisely the angular position required so that adequate sealing is ensured in the seating area. In order to provide a specific prescribed angle of rotation special measures are required for angle of rotation limitation, especially in the area of transformation between linear movement of the piston and rotary movement of the rotating shaft. In the case of the conventional rotating actuator the angle of rotation desired is retained in that a stop segment is mounted on the rotating shaft, at least one fixed stop is in the form of a guide rod, and stop segment and guide rod limit the angle of rotation directly at its exact prescribed value independently of piston stroke.

The conventional rotating actuator presents among others the disadvantage that the stop segment may be adapted to changed angle of rotation relationships only by relatively costly replacement of the segment. Changes in angle of rotation limitation due to wear and tolerances may not be made directly without such replacement. Other conventional rotating actuators either exhibit no features at all as regards angle of rotation limitation and angle of rotation setting (DE 298 14 551 U1; EP 0 622 574 B1) or they do exhibit such features (DE 33 03 872 A1) but are relatively complex in structure and not very maintenance-friendly.

The operating device for a pivotable valve body as disclosed in DE 33 03 872 A1 has a pivotably mounted piston in whose external piston jacket two curving guides in the form of diagonal grooves are incorporated diametrically opposite each other. Driving rollers rotatable about axes fixed in a cylinder wall of the operating devices engage these grooves. A driven shaft for operating the pivotable valve body is connected by force fitting inside the piston to the latter both axially and radially. In this design the piston accordingly executes both a stroke movement against the force of a reset spring and in addition the desired rotary movement of the driven shaft, so that a seal sealing the piston from the cylinder wall must execute this total movement resulting from piston stroke and angle of rotation. A form of movement such as this entails increased sealing wear. In addition, the operating device is not particularly assembly and maintenance friendly because of its complex structure, and especially because of the carrier rollers rigidly mounted internally on the cylinder wall.

Figure 3:
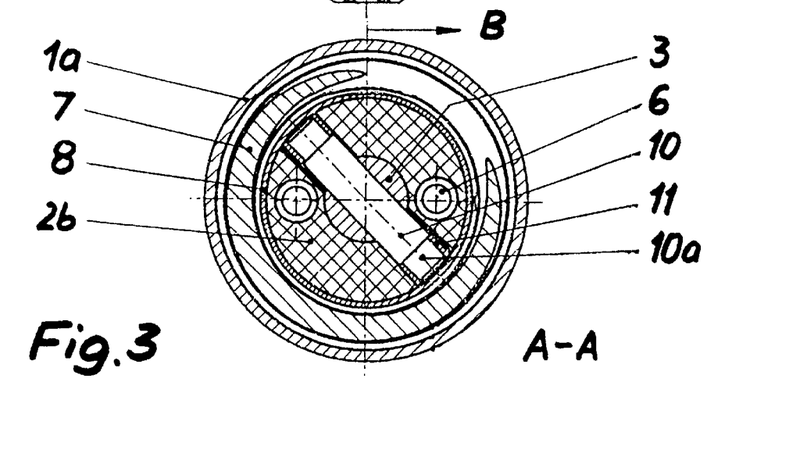
FIG. 3 a cross-section through the operating device as shown in FIG. 2 along a line designated as A—A.

Also prescribed for the rotating actuators for disk valves is the requirement that a higher torque than that in the angle of rotation area upstream or downstream be available during introduction of the closing element into or removal from the seating seal. According to the rules of conservation of energy, this means that in the course of drive movement a relatively small angle of rotation of the rotating shaft corresponds to a relatively large axial piston stroke. The helical guide groove is for this reason provided with varying pitches. Printed publication EP-B-0 622 574 B1 explicitly illustrates (FIG. 3) and describes a configuration of the guide groove, which, viewed as a whole, is not configured to be symmetrical at all points. As a result, the desired course of torque relative to the central position of the closing element may be changed only in one of the end positions, in the present case during opening and closing of the closing piece. It is also proposed in this connection that different associations be made between linear and rotary movement during opening and closing. This is accomplished in that the curve guide has a curved surface coordinated with the opening and closing movement of the valve (pertinent flank surface of the guide groove) each having a different curve gradient.

In order to make use of the generic operating devices as versatile and flexible as possible without the need for especially costly retrofitting operations, it is desirable for it to be possible to use the rotating actuator in air-opening and thus inevitably spring-closing operation and in air-closing and necessarily spring-opening operation. This requires a precise course of the guide groove or one more or less symmetrical at all points. A guide groove such as this is disclosed in U.S. Pat. No. 2,998,805 (FIG. 8). The guide groove there is exactly point-symmetrical in design, so that the pertinent end position of the closing element (closed position or open position) is approached with the same torque characteristic. The other rotating actuators referred to, because of their given kinematics either do not solve the present problem at all (threaded spindle/threaded nut system in DE 298 14 551 U1) or no specific comments are made regarding this aspect.

The object of this invention is to develop a generic operating device which is of simple design and maintenance-friendly, reliable, and versatile in use and with which a desired angle of rotation may easily be set and retained.

This object is attained by the features disclosed in the descriptive portion of claim 1. Advantageous embodiments of the operating device proposed make up the subjects of the dependent claims.

The two guide grooves, which are bounded on all sides by the piston shank and so are self-contained, as a result of their given point-symmetrical design, permit variable and thus universal use of the operating device. Since the course of torque required in the two end areas of the guide groove may be described, the actuator used may be both air-opening and so necessarily spring-closing and air-closing and so necessarily spring-opening. The two alternative solutions differ only in that the closing element of the valve, rotated 90 degrees relative to the other solution, is connected to the operating device in question as claimed for the invention. In addition, reliable and trouble-free use of the operating device is ensured by the two congruent guide grooves of the piston apron mounted diametrically opposite each other. Limitation of the piston stroke on both sides, on one side by application of the frontal end of the piston shank directly or indirectly to the cover element and on the other by application of a piston head adjoining the piston shank directly or indirectly to a stop element which is mounted in a base of the housing, permits precise limitation and setting of a desired angle of rotation. In all three of the embodiments referred to in the foregoing, the stop element is introduced into the housing base from outside the housing, so that in every case precise limitation and setting of the desired angle of rotation from the exterior by simple means is assured.

A first advantageous embodiment provides a stop element which is mounted directly in the base of the housing and is in the form of a fixed stroke limitation element. This stop, which may be screwed into the housing base until tightly and preferably fixed in position may, in conjunction with the measured tolerance of the components of the operating device involved, be assigned dimensions such that the desired initial position of the rotatable closing element of the valve, and additionally an angle of rotation of 90 degrees, are ensured. Presetting and costly adjustment of the stop element are as a rule not necessary.

The initial position of the rotatable closing element driven by the operating device can be adjusted with precision with a second embodiment of the proposed operating device. Such adjustment can be accomplished in that a stop element is mounted in a first stop fixing device and the latter is fastened directly in the housing base, and in that the associated end position of the piston may be modified with the stop component in one setting area, which is defined by a small stroke segment $\pm \Delta S$ which is comparatively small in relation to the full stroke of the piston.

Should limitation of the angle of rotation in the area of the operating angle amounting to a maximum of 90 degrees be desired in addition to simple adjustment of the initial position of the rotatable closing element of the valve, an additional embodiment of the proposed operating device provides that a stop element is mounted so as to be axially movable in a second stop holding device and the latter is fastened directly in the housing, and that with the stop element the associated end position of the piston may be modified within a setting range which is determined by the full stroke of the piston.

In a preferred embodiment the piston consists of plastic and is jacketed without interruption in a metal supporting tube. The plastic material above all simplifies production of the piston, while the supporting tube serves to stabilize the piston and thereby ensures safety and reliability of operating movements.

Another preferred embodiment of the proposed operating device provides that the lateral axis carries on a bearing journal smaller in diameter, along with the associated guide groove, a bearing bush of highly wear-resistant low-friction material on both sides and in any given engagement area, along with the associated guide groove. As a result of the low-friction and wear-resistant rolling movement, the most favorable conceivable kinematic and kinetic preconditions for reliable and safe progress of movement within the framework of transformation between linear and rotary movement are created between the lateral axis and the congruent guide grooves mounted diametrically opposite each other.

In addition, one advantageous embodiment of the proposed operating device provides that there is removably fastened on the end of the rotating shaft extending through the cover element a coupling element having a square opening in its end section and externally in the end section. This coupling element makes it readily possible to adapt the operating device to different types of valves and different nominal widths which, for example, are present in the form of squares of different sizes on the drive side.

As is additionally proposed, reliable and safe disassembly of the operating device is achieved in that the return spring between the piston head and the cover element is pretensioned and in the process positively compartmented with the transverse axis engaged in the guide grooves, by means of the rotating shaft mounted in the cover element. Since the transverse axis remains in the closed guide grooves, the tension of the pretensioned return spring between the piston head and the cover element may be relieved only to the extent permitted by the pertinent axial extent of the guide grooves.

The ease of maintenance of the proposed operating device is ensured in addition by a preferred embodiment in which the cover element is detachably fastened to the housing. This is accomplished in an especially simple manner by a so-called elastic round wire ring (snap spring), which positively immobilizes the cover element within the cylindrical circumferential wall of the housing but in a way permitting easy removal.

In order to permit return of the piston supported by pressurized means or exclusively by pressurized means, provision is additionally made such that the cover element is sealed off externally from the housing jacket by way of a second seal and radially in the interior from the rotating shaft by a third seal, and such that the space formed between the housing jacket, piston head, and cover element has an opening effecting connection to the exterior.

For the purpose of indication of the particular end position of the operating device another proposal provides that on its frontal surface facing the base of the housing the piston is removably connected to a piston rod which extends through the base of the housing and ends in an additional housing connected to the first housing which is mounted on the other side and into which a feedback communication device is introduced. Since the axial position of the piston forms an unequivocal indicator of the resulting angle of rotation, the latter can transmit data regarding the position of the piston and thus regarding the piston rod connected to it into the housing for the feedback communication device. Suitable feedback communication devices are provided there, ones which either provide an external visual display of the rotational angle position of the drive or transmit corresponding control signals to an associated control device.

In order to achieve steady and jolt-free transition between the individual rotation angle sections, another embodiment provides that the transitions between courses of the guide groove characterized by different pitch angles $\alpha$, $\beta$ are designed with a rounding radius R which is at least as large as the external radius of the bearing bushes.

Embodiments of the invention are illustrated in the drawing and are described in what follows. In the drawing.

As viewed from the exterior, the operating device (FIGS. 1 and 2) consists of a cup-shaped housing 1 which has a more or less cylindrical housing jacket 1a and, mounted on the latter a housing base 1b, preferably of the same material, with a pressurized means connection 1c for pressurized means D, a cover element 4 closing the end side of the housing jacket 1a, a central rotating shaft 3 mounted in the cover element 4 and extending through the latter, a coupling element 5 detachably fastened on the end of the rotating shaft 3, and a stop element 9 which is mounted more or less in the center of the housing base 1b.

In relation to the position illustrated, a piston 2 is movably mounted in the upper area of the housing jacket 1a, a piston which consists of a piston base 2a and an adjoining piston shank 2b smaller in diameter. There is provided in the jacket surface of the piston base 2a a sealing groove 2g which receives a piston seal 14 for sealing the piston base bottom 2a from the housing jacket 1a. Between the piston shank 2b projecting radially opposite the piston base 2a and the cover element 4 there is mounted a reset spring 7, preferably in the form of a cylindrical helical spring, which coaxially encloses the piston shank 2b. A central guide bore 2c which ends approximately at the beginning of the piston base 2a is introduced into the end of the piston shank 2b facing away from the piston base 2a. Two congruent helical guide grooves 2f positioned diametrically opposite each other are made in the wall of the piston shank 2b resulting from the dimensions of the central guide bore 2c; each of such grooves 2f is bounded on all sides by the piston shank 2b and the grooves are more or less point-by-point symmetrical. The rotating shaft 3 extending through the cover element 4 and mounted at the point of penetration continues in the interior of the housing 1 far enough so that it sufficiently engages, in the end position of the piston 2 impacted by the reset spring 7, the central guide bore 2c in the piston shank 2b. The rotating shaft 3 is guided in this engagement area and is penetrated in its end element present here by a transverse axis 10, which is also fastened there. The transverse shaft 10 bears on both sides and in each of its areas of engagement with the corresponding guide groove 2f, a bearing bush 11 of highly wear-resistant and low-friction material on both sides, on a bearing pin 10a smaller in diameter (also see FIG. 3).

The piston 2 is preferably made of plastic. This has the advantage over conventional solutions of steel that the piston 2 can be made simply and easily and at the same time is considerably lighter. In order to increase its stability in transmission of high torque values, its piston shank 2b is enclosed over its entire axial length without gap in a metal supporting pipe 8. The latter is immobilized on the piston shank 2b by way of a round wire snap ring 15. In addition, there is provided in the piston shank 2b, on both sides and symmetrically relative to its central axis, a guide bore 2d in which a guide rod 6 is guided and is in turned fastened in a rod bore 4b in the cover element 4.

At the point of penetration by the rotating shaft 3 of the cover element 4, two axially spaced bearing sleeves 12 are mounted by positive locking in a central bearing bore 4a situated in the cover element 4; in the interior they radially receive a cylindrical projection 3a of the rotating shaft 3. Mounted between the two bearing sleeves 12 leaving a grooved annular circumferential space is a third sealing ring 18, preferably an O ring, which ensures sealing of the rotating shaft 3 at its point of penetration of the cover element 4. The coupling-element 5 is mounted on the cylindrical projection 3a extending into the exterior beyond the cover element 4. It is connected there by form-fitting and frictional connection to the cylindrical projection 3a, for example, by way of a pin 19 in the form of a center-grooved dowel pin. A square opening 5a which may be of the widest possible variety of dimensions, is provided in the frontal side end section of the coupling element 5 for the purpose of connection of the operating device to various types of valves and their nominal widths.

Figures 4, 5:
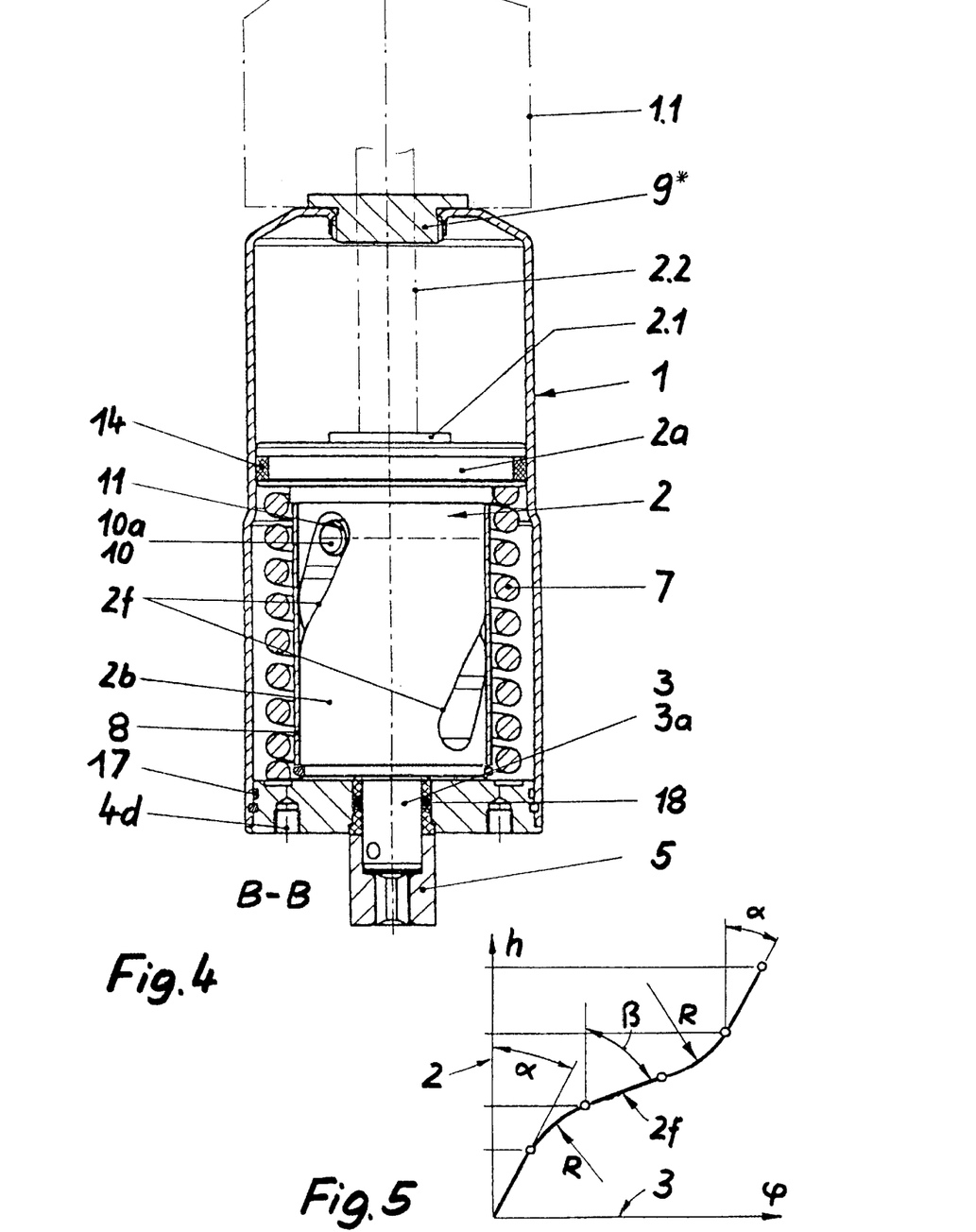
FIG. 4 the operating device as shown in FIG. 2 along a line designated as B—B.
FIG. 5 development of a preferred course of the helical guide grooves introduced into the piston shank.

The cover element 4 is removably fastened in the housing jacket 1a. A configuration which provides especially great ease of maintenance in this context is obtained by use of so-called elastic spring round wire ring 13, which, after it has been introduced by force into the required joining position, subsequently effects closure between housing jacket 1a and cover element 4 by elastic retroforming. A second sealing ring 17 ensures sealing between the cover element 4 and the housing jacket 1a. A connecting opening 4c to the exterior is provided in the cover element 4, by way of which ventilation and/or delivery of pressurized means or removal of such means is/are effected, for necessary introduction or removal of air to and from the space formed between piston base 2a and cover element 4 in the course of the switching movement of the operating device or for return of the piston 2 supported by pressurized means or effected by pressurized means alone. The operating device is fastened to a valve not shown by way of at least two connecting bores 4d in the cover element 4 (FIG. 4).

Figure 1:
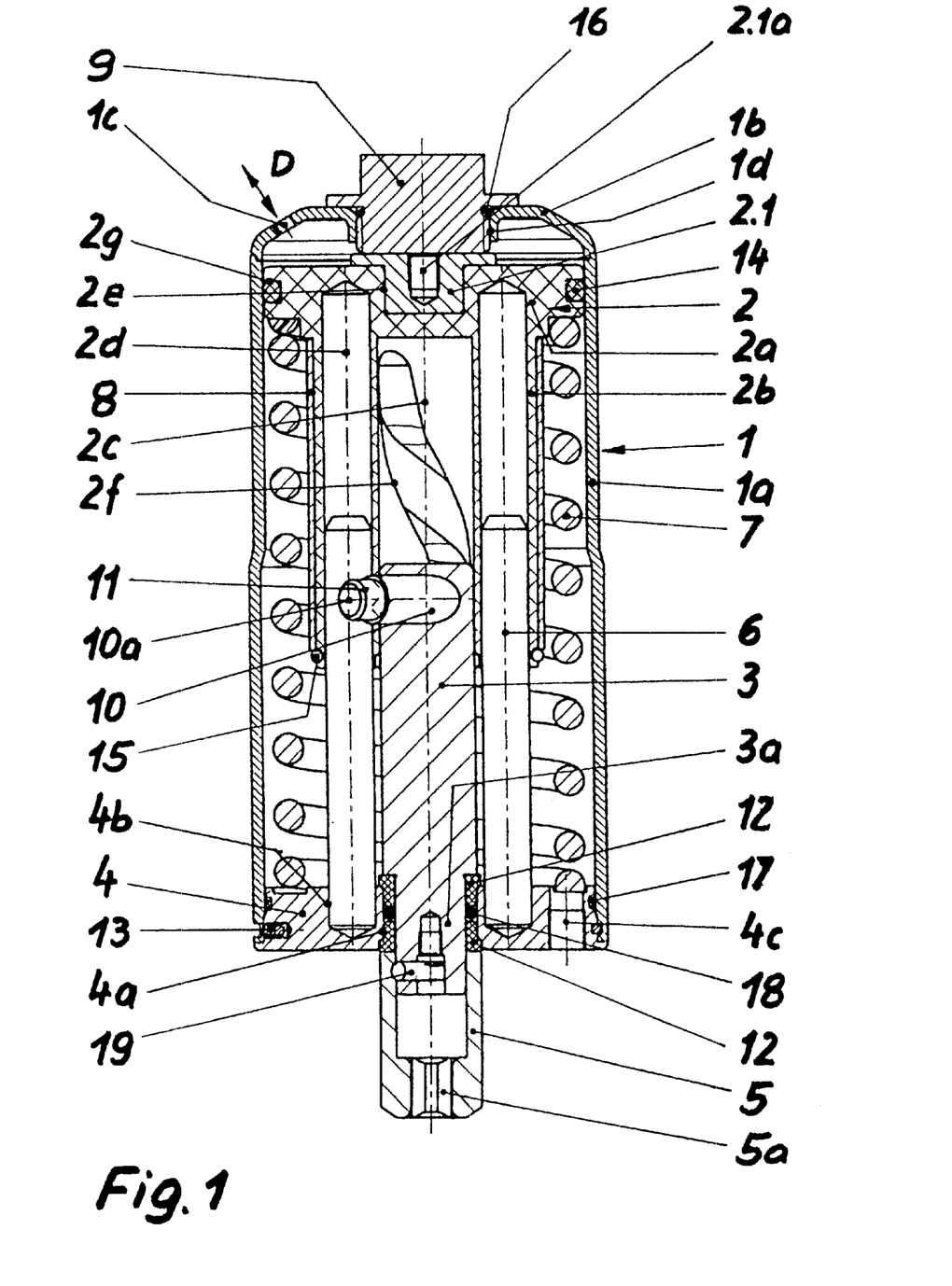
FIG. 1 shows a cross-section through a first embodiment of the operating device claimed for the invention, the piston being in its first end position as a result of the action of a return spring.
Figure 2:
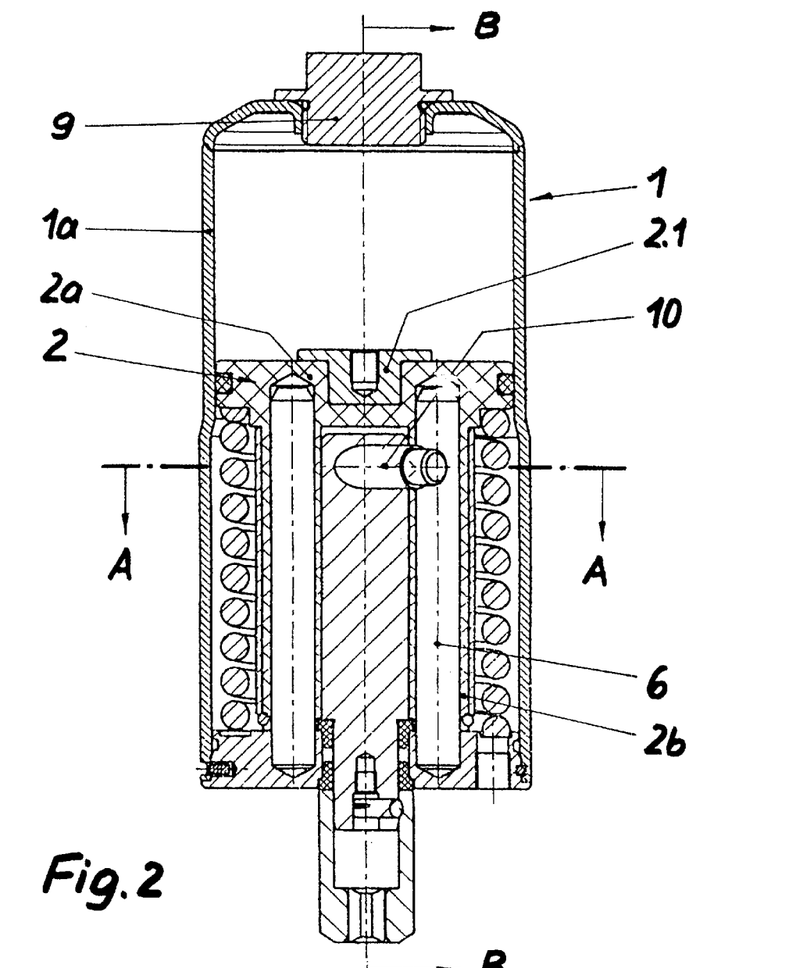
FIG. 2 the operating device shown in FIG. 1, the piston being in its second end position as a result of the action of pressurized means.

In the frontal side of the piston base 2a there is provided, preferably in the center, a cylindrical recess 2e (FIGS. 1 and 2) which receives an insert 2.1 provided with a central threaded bore 2.1a. The stop element 9 is screwed from outside the housing 1 into a threaded insertion opening 1d mounted, preferably in a central position, in the housing base 1b. The stop element 9 forms a solid stop for the piston 2, one which in the configuration illustrated encounters its stroke and thus end position limit indirectly by way of the insert 2.1. The second stroke and thus end position of the piston 2 is found by the latter by application of the frontal end of the piston shank 2b directly to the cover element 4 (FIGS. 2 and 4). A first sealing ring 16 ensures sealing of the stop element 9 in the housing base 1a (FIG. 1). With respect to its part projecting into the housing jacket 1a, the stop element 9 has dimensions such that in the associated end position of the piston 2 limited by the stop element 9 the rotating shaft 3 and thus the rotating closing element of the valve driven by the operating device are oriented precisely toward an axial position or toward one oriented at an angle of 90 degrees to such position.

If the respective position of the rotatable closing element of the valve is to be detected and reported, another embodiment of the proposed operating device provides that the piston 2 is removably connected by its frontal side facing the housing base 1b to a piston rod 2.2 (FIG. 4) which extends through housing base 1b and ends in an additional housing 1.1 mounted on the other side connected to the housing 1 in which a feedback device is accommodated. For this purpose the piston rod 2.2 is fastened in the threaded bore 2.1a of the insert 2.1 and extends, under sealing, through a modified stop element 9*.

When pressurized means D (FIGS. 2 and 4), preferably compressed air (see FIG. 1 in connection with pressurized means delivery), is applied to the space formed above the piston 2 in housing 1, the piston 2 is displaced downward translationally against the force of the return spring 7 without being able to rotate. The rotating shaft 3 is rotated through a corresponding angle of rotation $\phi\Delta$ because of the helical guide grooves 2f made in the piston shank 2b, which grooves are engaged by the bearing bushings 11 mounted on the transverse axis 10.

FIG. 5 illustrates the relationship between the angle of rotation $\phi$ of the rotating shaft 3 and stroke h of the piston 2 originally responsible for the relationship. The illustration clarifies the course of the guide groove 2f, the course being precisely symmetrical at all points in the case in question. A central portion of the guide groove 2f has in relation to the axis of the piston 2 an angle of inclination $\beta$ which is greater than the respective angle of inclination $\alpha$ on the two end-section portions of the guide groove 2f. The equality of the desired torque processes to be striven for in the closing area of the valve is achieved with a spring-closing and an air-closing operating device as a result of equality of the two angles of inclination $\alpha$ on the two ends. Steady and smooth transition between the two areas of the guide groove 2f provided with angles of inclination $\alpha$ and $\beta$ is ensured by rounding of the guide groove 2f with a rounding radius R which is at least as large as the external radius of the bearing bushes 11. In place of the bearing bushes 11 just described, entrainment of the rotating shaft 3 by way of the guide grooves 2f may also be effected by low-friction and low-wear sliding or roller-mounted carrier rollers 11.

As an alternative to return of the piston 2 exclusively by means of the return spring 7, return of the piston 2 may also be provided by such return assisted by pressurized means D or effected exclusively by such means. For this purpose pressurized means D is applied by way of the connecting opening 4c to the space between the piston base 2a and the cover element 4, in which the return spring 7, which may be dispensed with in this instance, is installed, among other elements. The sealing required for this space is already provided by the seals 17 and 18 (FIG. 1).

In addition, the piston 2 may also be secured from torsion relative to the housing 1 in a manner different from that provided. There are in the state of the art referred to previously a number of proposals to this effect, such as that to the effect that the reaction moment by way of the piston 2 into the housing 1 resulting from conversion of linear movement of the piston 2 to rotary movement of the rotating shaft 3 can be diminished (for example, rectilinear movement in the housing jacket 1a or on the cover element 4; by means of radial displacement (eccentricity) between the piston shaft and rotating shaft).

Figure 6:
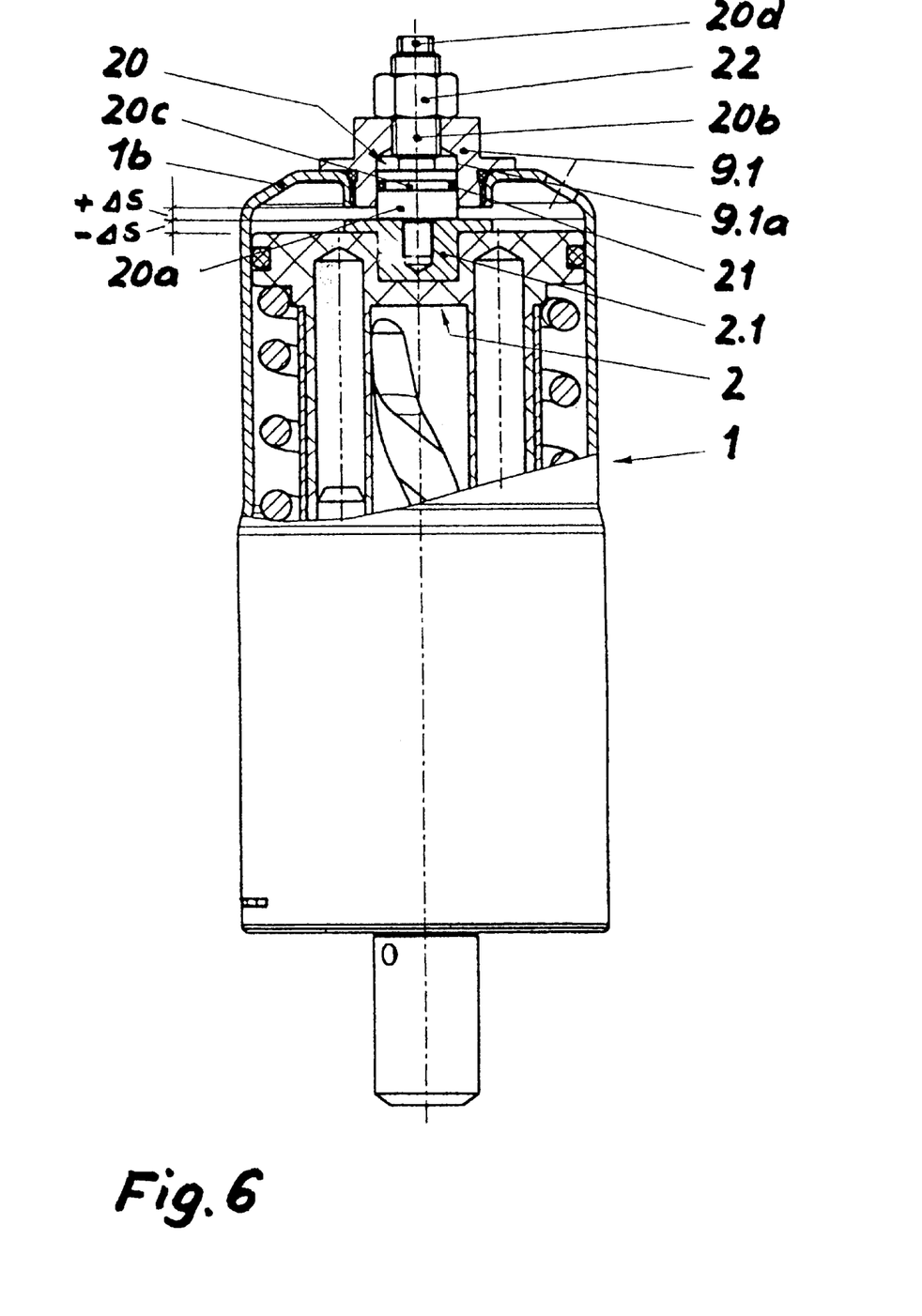
FIG. 6 a cross-section through a second embodiment of the operating device claimed for the invention, which, in contrast to the embodiment shown in FIG. 1, is provided with an axially movable stop element.

Precise setting and adjustment of the end position of the piston 2 associated with the housing base 1b (FIG. 6) is achieved by means of a stop element 20 which is mounted in a first stop mounting 9.1 so as to be axially movable. As is the case with stop element 9, the latter is inserted by way of threading directly in the housing base 1b and sealed. The stop element 20 consists of a cylindrical piston element 20a which is guided and sealed in a cylindrical recess 9.1a. For this purpose it has a circumferential sealing groove 20c in which a fourth sealing ring 21 is mounted. The piston element 20a is at the top reduced to a threaded element 20b smaller in diameter which extends through the first stop mounting 9.1 and from the latter into the open. At the end of the threaded element 20b a first carrier 20d is molded on; by means of this carrier 20d the stop element 20 is rotated inside the first stop mounting 9.1 and so may be axially twisted. The stop element 20 is secured in a first axial position by a first lock nut 22 on the part of the threaded element 20b projecting from the first stop mounting 9.1 into the open. By means of the stop element 20 the associated end location of the piston 2 may be varied over a setting range, determined by a partial stroke $\pm\Delta$, which is relatively small in comparison to the full stroke H (see FIG. 7) of the piston 2. The piston 2 rests on the stop element 20 by way of the insert 2.1.

Figure 7:
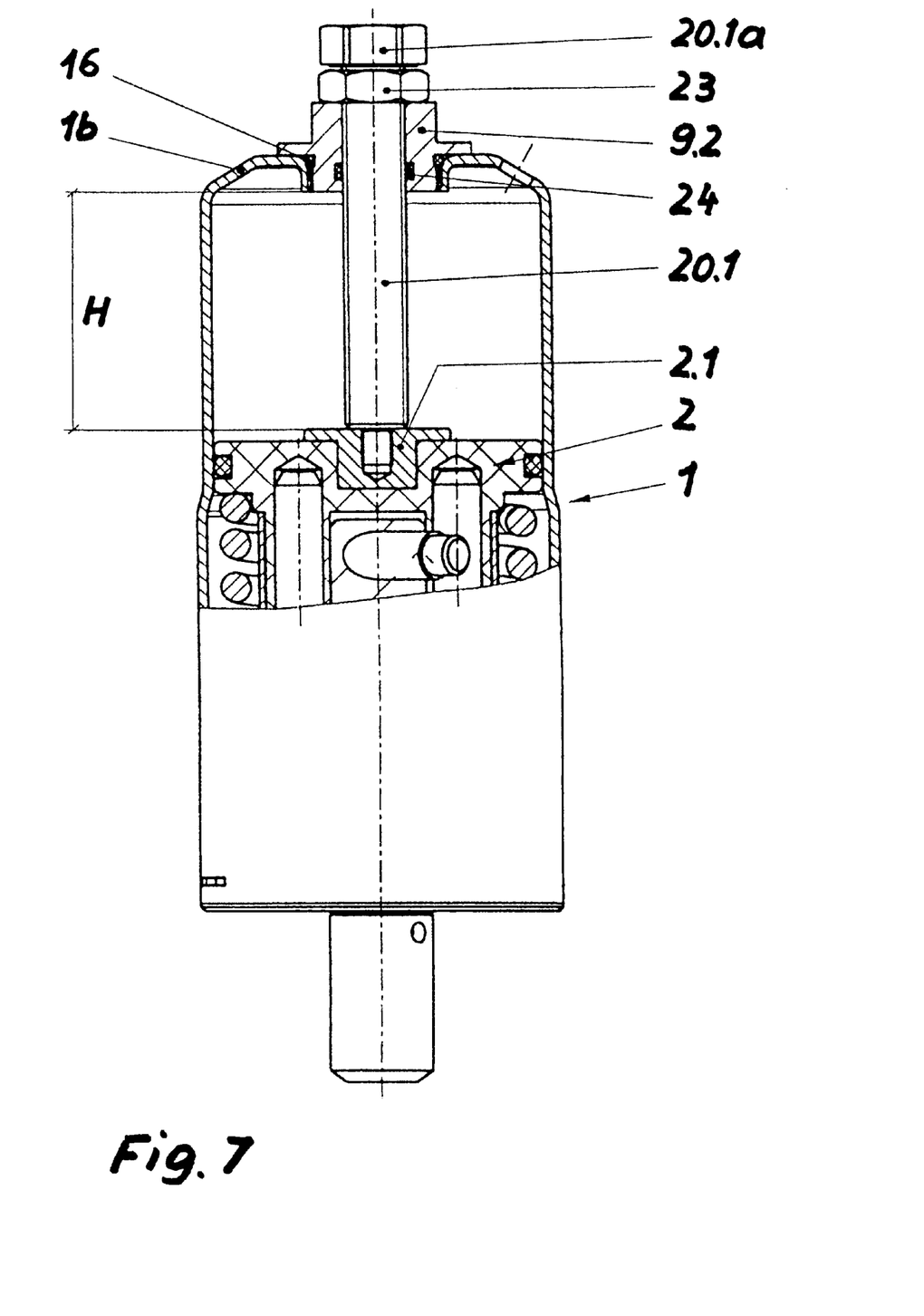
FIG. 7 a cross-section through a third embodiment of the operating device claimed for the invention, an axially movable stop element being provided which creates a setting area larger than that shown in FIG. 6.

FIG. 7 shows a stop element 20.1 which is inserted by way of threading into a second stop mounting 9.2 and which may be displaced in the latter so that the associated end position of the piston 2 may be varied within in a setting range determined by the full stroke H of the piston 2. The second stop mounting 9.2 is inserted by way of threading directly into the housing base 1b and is sealed there by way of the first sealing ring 16. The bolt threading of the stop element 20.1 is sealed from the latter by way of a threaded sealing ring 24 mounted in the second stop mounting 9.2. A second lock nut 23 fixes the stop element 20.1 against twisting and thus axially immobile in the second stop mounting 9.2. A second carrier 20.1a, for example one in the form of a hexagonal nut, is provided at the end of the stop element 20.1. The piston 2 rests on the stop element 20.1 by way of the insert 2.1.

What is claimed is:

1. An operating device for a rotatable closing element of a valve, in particular a rotary drive to which pressurized means may be applied, for a disk or throttle valve consisting of a housing (1) with a pressurized means connection (1c), a piston (2) movable linearly inside the housing and sealed off from a housing jacket (1a), which, when a pressurized means (D) is applied to it, executes a stroke movement against the action of at least one return spring (7), a piston shank (2b) mounted on the piston (2), two helical guide grooves (2f) mounted diametrically opposite each other and introduced into the piston shank (2b), a cover element (4) sealing the housing (1), a central rotating shaft (3) mounted in the cover element (4), a transverse shaft (10) fastened in the rotating shaft (3) and engaged in the guide grooves (2f), two guide rods (6) fastened in the cover element (4), engaging the piston (2) and securing it from twisting, provisions for limitation of an angle of rotation ($\phi$) of the rotating shaft (3) on both sides, and with a stop limiting the stroke of the piston (2) on one side by application of the front-end piston shank (2b) to the cover element (4) and on the other side by application of a piston base (2a) adjoining the piston shank (2b) to a stop element (9; 20; 20.1), characterized in that (a) the guide grooves (2f) are bounded on all sides by the piston shank (2b), (b) the respective course of the grooves (2f) is designed to be exactly or more or less symmetrical at all points, in that each exhibits, in relation to the axis of the piston (2), in a central section (angle $\beta$) a greater angle of inclination than in their two end sections (angle $\alpha$), (c) and in that the stop element (9; 20; 20.1) is introduced from outside the housing (1) into the housing base (1b) and access to the stop element (9; 20; 20.1) from outside is provided.

2. The operating device as specified in claim 1, wherein the stop element (9) is mounted directly in the housing base (1b) and is designed as fixed stroke limit means.

3. The operating device as specified in claim 1, wherein the stop element (20) is mounted so as to be axially movable in a first stop mounting (9.1) and this mounting is fastened directly in the housing base (1b), and wherein, along with the stop element (20), the associated end position of the piston (2) may be varied within a setting range which is determined by a partial stroke (±Δs) which is small in comparison to the full stroke (H) of the piston.

4. The operating device as specified in claim 1, wherein the stop element (20.1) is mounted so as to be axially movable in a second stop mounting (9.2) and this mounting is fastened directly in the housing base (1b), and wherein, along with the stop element (20.1), the associated end position of the piston (2) may be varied within a setting range which is determined by the full stroke (H) of the piston (2).

5. The operating device as specified in claim 1, wherein the piston shank (2b) of the piston (2) made of plastic is enclosed over its entire axial length without gap in a metal supporting pipe (8).

6. The operating device as specified in claim 1, wherein the transverse axis (10) bears, on both sides and in the respective area of engagement with the associated guide groove (2f), a bearing bush (11) of highly wear-resistant and low-friction material, on a bearing pin (10a) smaller in diameter.

7. The operating device as specified in claim 1, wherein there is removably fastened on the end of the rotating shaft (3) extending through the cover element (4) a coupling element (5) having a square opening (5a) in its frontal end section.

8. The operating device as specified in claim 1, wherein the return spring (7) is pretensioned between the piston base (2a) and the cover element (4) and in the process positively compartmented by means of the rotating shaft (3) mounted in the cover element (4) in conjunction with the transverse axis (10) engaged in the guide grooves (2f).

9. The operating device as specified in claim 1, wherein the cover element(4) is removably fastened on the housing (1).

10. The operating device as specified in claim 1, wherein the cover element (4) is sealed externally from the housing jacket (1a) by way of a second seal (17) and radially internally from the rotating shaft (3) by way of a third seal (18), and wherein the space formed between housing jacket (1a), piston base (2a), and cover element (4) has a connecting opening (4c) to the exterior.

11. The operating device as specified in claim 1, wherein the piston (2) is removably connected on its frontal side facing the base (1b) of the housing to a pistonrod (2.2) which extends through the base (1b) of the housing and ends in an additional housing (1.1) receiving a feedback device and connected to the housing (1).

12. The operating device as specified in claim 1, wherein the transitions between the courses of the guide groove (2f) provided with different pitch angles ($\alpha,\beta$) are executed with a rounding radius (R) which is at least as large as the external radius of the bearing bushings (11).

* * * * *